N. S. JOHNSON.
HARROWS.

No. 194,353. Patented Aug. 21, 1877.

RENEWED

Witnesses:
Clarence Thurlow
E. C. Rolands

Inventor
Nelson S. Johnson
(by E. Thurlow Atty.
in fact)

UNITED STATES PATENT OFFICE.

NELSON S. JOHNSON, OF FIAT, ILLINOIS.

IMPROVEMENT IN HARROWS.

Specification forming part of Letters Patent No. 194,353, dated August 21, 1877; application filed July 3, 1877.

*To all whom it may concern:*

Be it known that I, NELSON S. JOHNSON, of Fiat, in the county of Fulton, in the State of Illinois, have invented an Improvement in Harrows; and do hereby declare that the following is a full, clear, and exact description thereof, reference being had to the annexed drawings, making a part of this specification, in which like letters of reference refer to like parts, and in which—

Figure 1:
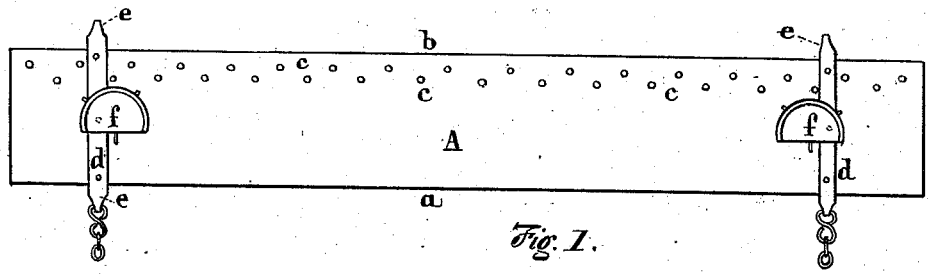
Figure 2:
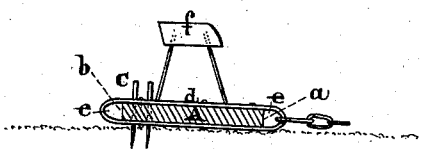

Figure 1 represents a plan view; Fig. 2 a cross-section.

Farmers have long felt the want of a cheap and simple crushing and smoothing harrow, easily made from materials at hand on a farm or within easy reach. It is composed of a long board or plank, studded along one of its edges (lengthwise) with ordinary harrow-teeth, which may be made changeable for other teeth, and may be strengthened by transverse bars or metal bands or clamps, to which the draft may be attached.

A seat in the middle, or one at each end of the harrow, may be used to add weight, if necessary. To this board may be added, if required, one or more similar boards by means of joints on that edge farthest removed from said teeth to assist the crushing and smoothing process.

This harrow is drawn over the soil broadside at the center or near, if small, but if long a team may be attached to each end, with driver, provided with seat, to each team. When clods are to be broken and crushed, that edge of the harrow armed with teeth proceeds first; but in smoothing or pulverizing the soil the toothless side of the harrow goes first, the implement being thus convertible by the placing of the teeth and of the change of the draft to either side of the harrow. To facilitate the change or convertibility of the latter to a clod-crusher or a smoothing-harrow, I use a transverse rod attached to the harrow parallel with its upper face, along which the ring or connection with the draft-chain may slide in such a manner as to obviate the unhitching and rehitching of the draft to the harrow.

Figure 3:
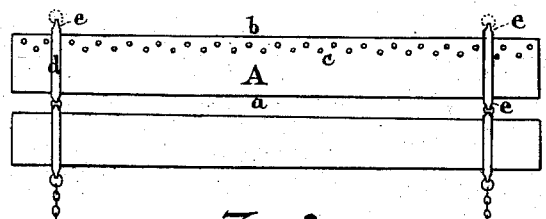

One of the forms in which I construct my harrow I will now describe. A is the harrow, composed of a heavy plank or board several times longer than its width, and made of the required length to cover the extent of ground desired to be harrowed at one passage. If the ground be very rough a second or third plank of similar size may be hinged to the first, parallel with it, as in Fig. 3. It is strengthened or bound at either end by a band or clamp, $d\ d$, each having an eye or loop, $e$, at either edge of the board for attachment of the draft, and a seat or seats, $f$, one at each end, if a large harrow. If clods are to be destroyed the toothed side goes in advance. If smoothing is to be done the opposite edge V is used in advance.

What I claim as my invention is—

1. The harrow composed of a single plank, A, having teeth $c$ at one edge only, and draft attachments (rings or loops) for drawing the same in either direction laterally, according to its requirement as a smoother or pulverizer, or a clod-crusher, substantially as and for the purposes described.

2. The harrow A, provided with teeth $c$ on one edge, bands $d\ d$, and loops $e\ e$ or draft attachments at either edge of the board, and seat or seats $f$, substantially as and for purposes described.

In testimony that I claim the foregoing improvement in harrows I have hereunto set my hand this 27th day of June, A. D. 1877.

NELSON S. JOHNSON.

Witnesses:
B. C. JOHNSON,
HENRY W. WELLS.